Inventor
Ernst Siegling
By Karl Viertel
Attorney

Sept. 10, 1940.     E. SIEGLING     2,214,541
BELT DRIVE
Filed Nov. 12, 1938     2 Sheets-Sheet 2
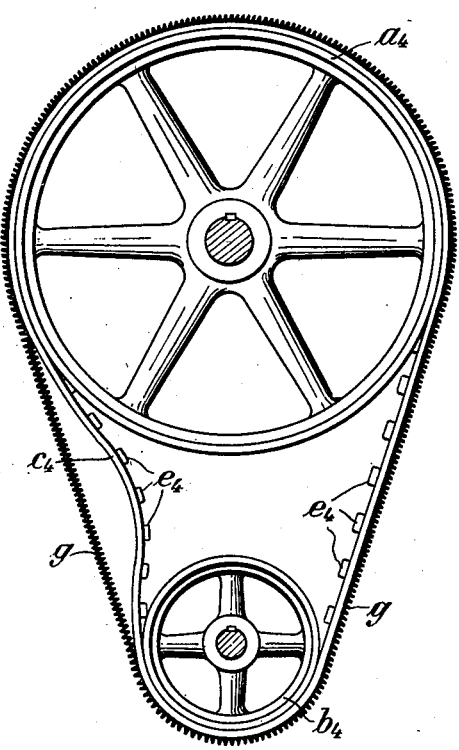
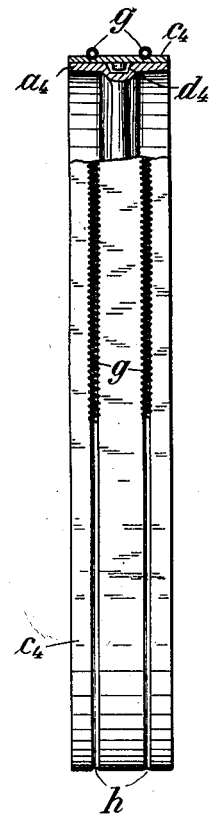
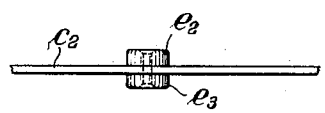
Inventor
Ernst Siegling
By
Karl Viertel
Attorney Patented Sept. 10, 1940

2,214,541

UNITED STATES PATENT OFFICE 2,214,541

BELT DRIVE

Ernst Siegling, Hanover, Germany

Application November 12, 1938, Serial No. 240,101
In Germany December 6, 1937

6 Claims. (Cl. 74—232)

My invention relates to improvements in belt drives; the problems underlying this invention and the advantages obtained will be more fully understood by critically reviewing some specific drawbacks inherent to belt drives of the conventional type, wherein flat belts, as against other types of belts, such as link belts or belts of wedge cross sectional shape, are used.

In practice so-called crowned pulleys are widely used with the object of causing flat belts to keep running in their proper working position, namely without deviating from their straight forward path of travel; however as a matter of fact known to experts in this field flat belts cannot be relied upon to run exactly straight forward even on crowned pulleys, if the belt is only under small tension or under no tension at all, as proposed in my co-pending United States Patent application Ser. No. 190,056, now Patent No. 2,147,465, and also when the belt has individually a tendency of swinging laterally.

Another drawback characteristic of flat belts consists in that, because of their high initial tension, which usually is much higher than the effective pull produced, their working efficiency is curtailed by the consequent high pressure and frictional resistance in the bearings of the pulleys.

The principal object of this invention is to provide belt drives of the type, wherein a flat belt is used, with efficient, structurally simple and inexpensive means for positively securing the belt in its proper working position.

The invention further aims at structurally improving belt drives of the type described in my said aforementioned application, wherein a flat belt in slack condition is pressed against the pulleys by one or more tensioning elements such as spiral springs.

Still other objects of the invention will become incidentally apparent to practitioners as the description proceeds.

Figure 1:
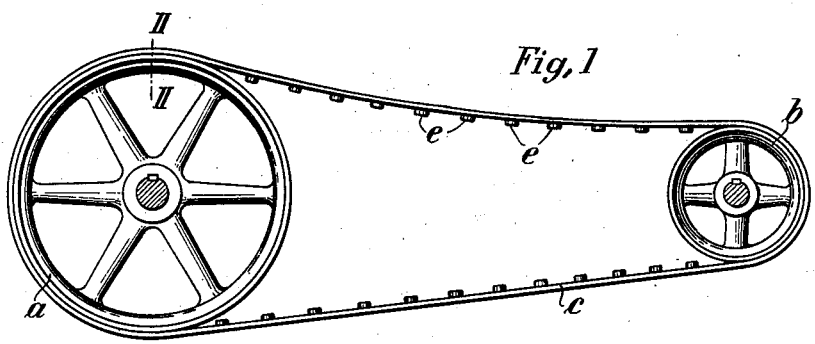
Figure 4:
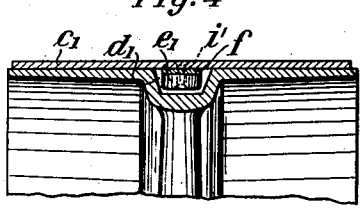
Figure 2:
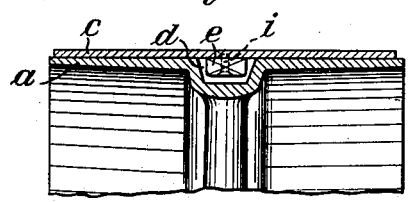
Figure 5:
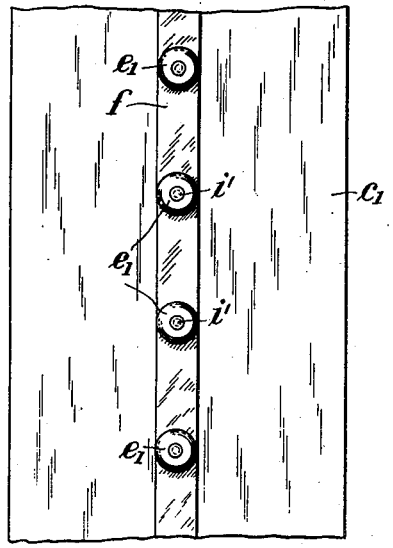
Figure 3:
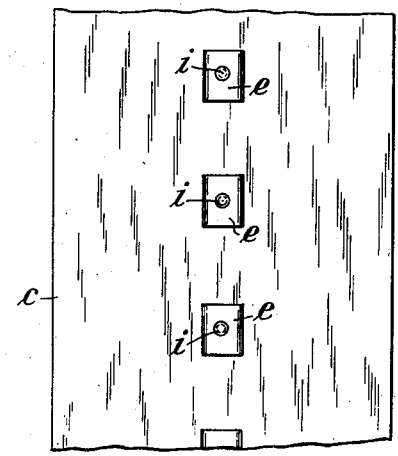

The nature and scope of this invention are briefly outlined in the appended claims and will be more fully understood from the following specification taken together with the accompanying drawings, in which Fig. 1 is a side elevation diagrammatically showing by way of an example a belt drive designed according to this invention, Fig. 2 is a cross section vertically taken on line II—II in Fig. 1, Fig. 3 is a plan showing the belt of Fig. 2 alone as seen from its lower or working side, Fig. 4 is a cross section through a pulley and belt of another design, Fig. 5 is a plan showing the belt of Fig. 4 alone as seen from its bottom side, Fig. 6 is a cross section through a belt of modified design, to be used according to this invention in connection with angle drives, Fig. 7 is a side elevation of a belt drive of the design described in my said aforementioned application, and still further improved according to this invention, Fig. 8 is a front view—partly in section—of the belt drive shown in Fig. 7.

With the objects in view outlined above the flat belts, as used according to this invention, are provided with spaced guide elements projecting from the inner or working side of the belt; the pulleys on which the belt runs are preferably flat faced and have a circumferential recess or groove for cooperation with said guide elements.

According to this invention the cross sectional shape, width and depth of said guide elements and of said grooves are so chosen relatively to each other that only "point" or "line" contact, that is to say an edge contact will occur whenever the said guide elements temporarily engage the side walls of the recesses concerned.

In the embodiment of the invention shown in Figs. 1 to 3, $a$ and $b$ are flat pulleys over which the belt $c$ runs; the pulleys are formed with recesses $d$ of trapezoidal cross sectional shape, while the guide elements $e$, fixed at the belt by rivets $i$ or the like, are rectangular as to the cross sections taken therethrough in both directions, longitudinally and transversely.

In the structurally modified belt drive shown in Figs. 4 and 5 flat discs $e1$ are used as guide elements and are revolvably fixed to the belt $c1$ by means of bolts $i'$ and a protective intermediary layer in the form of a continuous strip $f$; the discs $e1$ are capable of being turned around on coming into contact with one of the side walls of the recess $d1$ in the pulley, whereby the frictional resistance and transmission of energy at this part of the belt is reduced to a minimum.

Good results have been obtained in the course of the inventor's own manufacture with belt drives, wherein the said guide elements of the belt were made of sole-leather, semihard leather, hard rawhide leather, compressed canvas or hardened plastic materials, while the protective layer $f$ (Figs. 4 and 5) was made of leather.

Various other modifications may be conveniently made in belt drives of the improved design described, without departing from the spirit and the salient ideas of this invention.

For instance the belt $c2$ shown by way of another example in Fig. 6 may be provided to advantage on both sides with projecting guide members e2, e3, if used for angle drives, where both sides of the belt—the upper and lower one—come alternately into contact with the pulleys.

The invention offers specific advantages in combination with belt drives of the design described in my said aforementioned application, and shown in Figs. 7 and 8 of the drawings; there a flat belt c4 of extraordinary length is used, embracing the flat faced pulleys a4, b4 in fully slack condition and being pressed against the pulleys by elastic tensioning elements such as spiral springs g which are retained in their working position by constantly open grooves n formed in the outer face of the belt, and wherein said spiral springs are seated.

In Figs. 7 and 8, as in said aforementioned application, the belt is longer than a taped line drawn tightly over and between adjacent pulleys and, in other words, the belt is so long that when one side of it is taut, the slack side separates from the spring-pressing member as shown in Fig. 7. It will be noted in Fig. 8 that the spring-pressing elements g which serve to press the belt against the pulleys are located at either side of the center of the pulley and not opposite the groove of the pulley but opposite the face of the pulley whereby the tension of the pressing element may force the belt against the pulley.

By the provision of guiding elements e4 of the type described for cooperation with corresponding recesses d4 formed in the pulleys a4, b4, a highly accurate, truly rectilinear running of the belt c4 is ensured with the result that relatively shallow grooves h will safely retain the springs in their proper place, and that thinner and more flexible belts—affording a still higher efficiency of the belt drive—can be used, whereinto said shallow grooves may be cut, without excessively weakening the belt.

What I claim is:

1. In an energy transmitting belt drive, a pair of pulleys each having a circumferential recess and a flat belt engaging said pulleys, and being provided at its inner working surface with spaced guide elements projecting into said recess, said guide elements being of a rectangular cross sectional shape, while the said recesses are of trapezoidal cross sectional shape, whereby line contact will temporarily occur at the side walls of the recess and the guide elements.

2. In an energy transmitting belt drive, a pair of pulleys each having a circumferential recess and a flat belt engaging said pulleys and being provided at its inner working surface with spaced guide elements projecting into said recess, said guide elements being made in the form of flat, round discs rotatably fixed at the belt, whereby only point contact will occur at the side walls of the recess and the guide elements.

3. In an energy transmitting belt drive, a pair of pulleys each having a circumferential recess and a flat belt engaging said pulleys and being provided at its inner working surface with spaced guide elements projecting into said recess, a protective layer interposed between said guide elements and said belt, said guide elements being made in the form of flat round discs rotatably fixed at the belt, whereby only point contact will occur at the side walls of the recess and the guide elements respectively.

4. In an energy transmitting belt drive, a pair of pulleys each having a circumferential recess, a flat belt of extraordinary length engaging said pulleys, the driven side of the belt being practically without tension, while the tension in the driving side does not practically exceed the effective pull, guide elements fixed at the inner surface of the belt and projecting into said recesses, and an endless tensioning element embracing the belt from without so as to press it against the pulleys, and a shallow groove in the outer face of the belt wherein said tensioning element is seated.

5. In a power transmitting belt drive, a pair of pulleys each having a circumferential recess, a belt embracing both pulleys and of a length adapted to hang in slack position on one side of the pulleys during normal driving operation, said belt having at the outer face thereof and extending therearound two constantly open grooves for the reception of pressing elements operating under tension, one each of said grooves being at opposite sides of the center line of the belt and at opposite sides of said recesses, an endless flexible pressing member embracing both said pulleys and said belt and each of said grooves and each being retained therein solely by its respective groove and its own tension in the region of said pulleys and on the taut side of said belt, that portion of the belt on the slack side being longer than the pressing member on the same side of the pulleys, whereby the center portion of it between the pulleys separates from the pressing member, and guide elements fixed at the inner surface of said belt and projecting into said recesses of each of said pulleys.

6. In a power transmitting belt drive, a pair of pulleys each having a circumferential recess, a belt embracing both pulleys and of a length adapted to hang in slack position on one side of the pulleys during normal driving operation, said belt having at the outer face thereof and extending therearound two constantly open grooves for the reception of pressing elements operating under tension, one each of said grooves being at opposite sides of the center line of the belt and at opposite sides of said recesses, an endless flexible pressing member embracing both said pulleys and said belt and each of said grooves and each being retained therein solely by its respective groove and its own tension in the region of said pulleys and on the taut side of said belt, that portion of the belt on the slack side being longer than the pressing member on the same side of the pulleys, whereby the center portion of it between the pulleys separates from the pressing member, and guide elements fixed at the inner surface of said belt and projecting into said recesses of each of said pulleys, the configuration of the side walls of said recesses and the relative configuration of said guide elements being such that an edge contact will occur when said guide elements engage the side walls of said recesses.

ERNST SIEGLING.